J. M. WILDER.
Meat Mincer.
No. 4,042. Patented May 10, 1845.
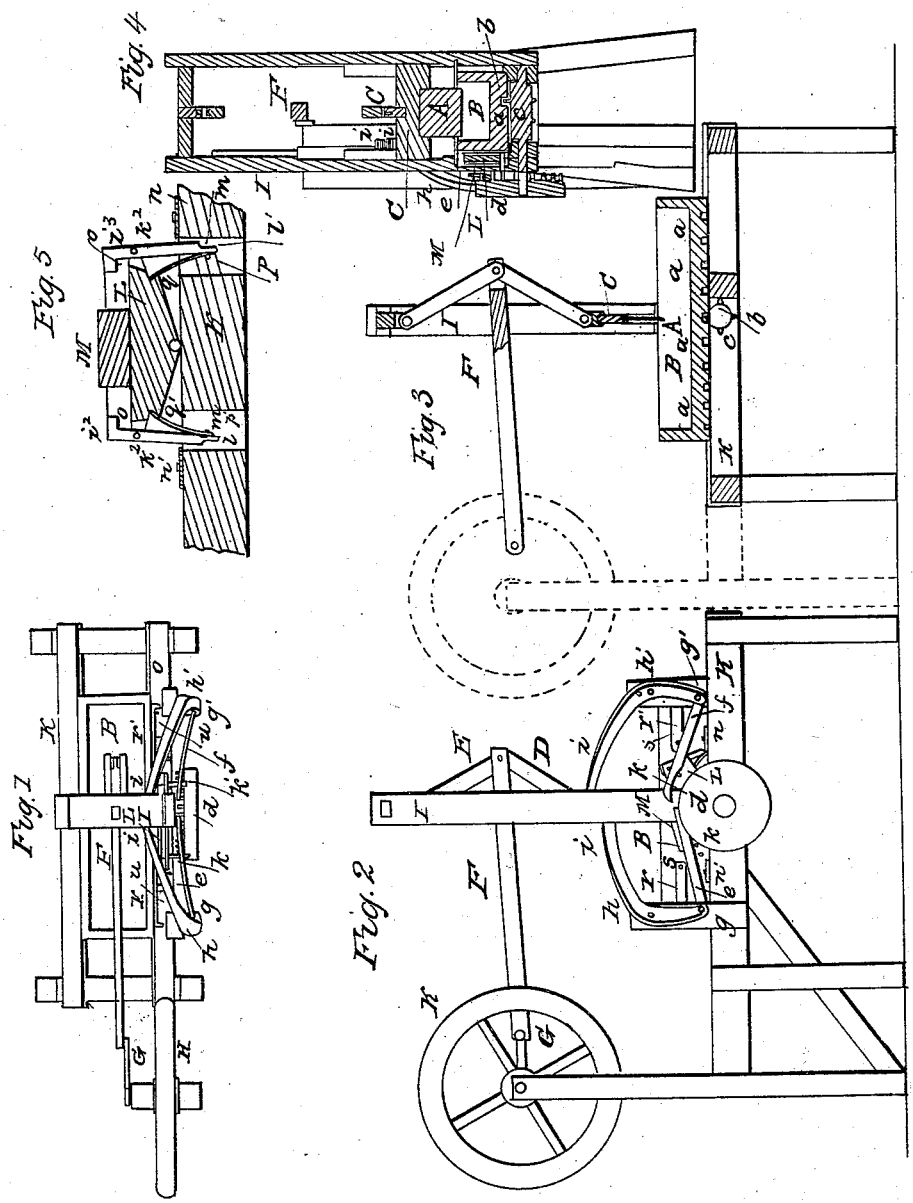

UNITED STATES PATENT OFFICE.

JAMES M. WILDER, OF PETERBOROUGH, NEW HAMPSHIRE.

MEAT-CUTTER.

Specification of Letters Patent No. 4,042, dated May 10, 1845.

*To all whom it may concern:*

Be it known that I, JAMES M. WILDER, of Peterborough, in the county of Hillsborough and State of New Hampshire, have invented a certain new and useful Improvement in Mechanism Applicable to Machinery for Chopping Sausage-Meat and Various other Matters; and I do hereby declare that the nature of the same and the manner in which it performs its operations are particularly set forth and ascertained in and by the following statement thereof, reference being had to the drawings accompanying and making part of the same and to the letters and figures marked thereon—that is to say—

Figure 1, represents a top or plan view of my improved machine. Fig. 2, is a side elevation of it. Fig. 3, is a vertical central and longitudinal section of it, and Fig. 4, is a transverse section of the same.

The nature or peculiar character of my improvement consists in a mechanical combination applied to the trough in which the article to be chopped or otherwise acted upon is placed and the impelling machinery of the said trough for the purpose of alternately changing or reversing the movement of the trough so as to cause it to pass first in one direction underneath the chopping knife and next in an opposite one.

In such of the drawings as exhibit the same A, denotes a vertical chopping knife and B, a long trough or box in which the said knife is arranged and across which it extends transversely. The said knife is confined in or projects downward from a frame C, which being properly supported is moved vertically upward and downward by means of toggle joints D, E, operated by a connecting rod or pitman F, and a crank G, upon the horizontal shaft of a fly wheel H, the said toggle joints being arranged within a frame I, raised vertically upon the main frame K, by which the other parts of the mechanism are directly or indirectly supported. The box or trough (B,) is situated upon and adapted to the said frame so as to be movable both ways in the direction of its length. It has a rack of teeth or a series of indentations $a$, $a$, $a$, &c., formed within or upon its under side into which a pinion $b$, (upon a cross shaft $c$) gears. The said shaft $c$, has a cogged wheel $d$, upon its front end into the teeth of which two impelling pawls $e$, $f$, act alternately; the said pawls being arranged as seen in the side elevation and each being jointed at its rear end to one of two bent levers $g$, $h$, $i$, $g'$, $h'$, $i'$, whose fulcrums are at $h$, $h'$, and whose upper ends act upon or are jointed to the knife frame C. The inner end of each of the impelling pawls rests upon one of two projections or pins $k$, $k'$, extending from the side of a vibrating box L, placed between the pawls and the trough B, and supported upon and jointed to the frame work in such manner as to allow it to be tilted first in one direction and next in the other, or in other words to permit one end of the box to descend and the other to rise upward, and vice versa.

A weight or elongated piece of metal M, is placed within the box which is formed in its interior so as to permit the weight to be moved from one end of it to the other end in such manner as to overbalance either of said ends and cause it to descend and thereby elevate or raise upward the impelling pawl resting upon the projection $k$, extending from the opposite end of the box at the same time lowering downward the other pawl. The first pawl is thus raised from contact with the teeth of the wheel below it while the other pawl is depressed or allowed to descend into contact with the teeth of the wheel. Whichever pawl is in contact with the wheel will actuate it or cause it to turn around. A vertical section of the vibrating box and a part of the frame below it is given in Fig. 5. Within each end of the box one of two lever spring catches $i''$ $k'$, $l$, $i'''$ $k''$, $l'$, is placed and supported on a fulcrum at $k'$ or $k''$. Its lower end has a notch $m$, cut in it which is intended when the catch is raised upward to spring over and rest upon the upper part of one of two steps or shoulder pieces $n$, $n'$ fixed upon the upper side of the top rail $o$ of the main frame, the said top rail having two mortises $p$ $p'$ cut vertically through it for the spring catches to pass through respectively.

A spring $q$, is attached to the rear part of the lower end of each catch, and bears at its upper end against the lower part of the vibrating box in such manner as to throw the lower end of the catch against or in the direction of its shoulder piece or step $n$ or $n'$. When the weight M, is drawn or forced against one end of the box L, it meets the top part of the spring lever catch at the said end and throws it forward so as to cause its lower end to fall back or away from the shoulder rest $n$, and thus permit the said end of the box to descend and at the same time elevate the opposite end. On the said opposite end attaining its greatest elevation its spring catch is thrown over its shoulder rest and thus keeps the box L in position until the weight M is again moved toward the said end.

The movement of the weight M from one end of the vibrating box to the other end and vice versa is effected by two movable arms $r$, $r'$, arranged upon the side of the box or trough B, and each turning vertically up and down upon a fulcrum or joint pin $s$ at its inner end. The opposite or outer end of each arm is bent forward at right angles to the arm as seen in the plan view Fig. 1, and so that when the box or trough B, is moved so as to carry the one of the arms toward the weight M, the bent part of said arm shall be brought in contact with the end of the weight projecting above the box L, and as the trough continues to move force the weight toward and to the other end of the vibrating box.

When in a horizontal position each of the arms $r$, $r'$, rests upon one of two projections $u$, $u$, inserted in and projecting from the box or trough B. Thus by the tilting of the box L first on one side of its center and next on the opposite side thereof each pawl is in succession brought down upon the wheel below it so as to actuate or turn the same and thereby move the trough B, in opposite directions.

Having thus described my invention, I shall claim—

The combination of mechanical parts by which the alternate elevation and depression of each of the impelling pawls which operate or give motion to the trough B (through certain mechanism intervening between the said pawls and troughs) are effected, the said combination consisting in the following parts; viz: the peculiar tilting box L (having projections $k$, $k'$, to support the inner ends of the pawls, and spring catches $i''$ $k'$, $l$, $i'''$ $k''$ $l'$) the weight M, (made to slide from one end of the box to the other end of it) and the movable arms $r$, $r'$ applied to the side of the trough, the whole being constructed, combined with the impelling apparatus and trough, and operating substantially as above described.

In testimony whereof, I have hereto set my signature, this fifteenth day of March, A. D. 1845.

JAMES M. WILDER.

Witnesses:
R. H. EDDY,
CALEB EDDY.